United States Patent
Laluvein et al.

(10) Patent No.: US 7,948,628 B2
(45) Date of Patent: May 24, 2011

(54) WINDOW CLEANLINESS DETECTION SYSTEM

(75) Inventors: Bernard E. H. Laluvein, Eastcote (GB); Timothy A. James, Harrow (GB)

(73) Assignee: Thorn Security Limited, Sunbury-on-Thames, Middlesex (GB)

( * ) Notice: Subject to any disclaimer, the term of this patent is extended or adjusted under 35 U.S.C. 154(b) by 145 days.

(21) Appl. No.: 11/921,113

(22) PCT Filed: Feb. 17, 2006

(86) PCT No.: PCT/GB2006/000572
§ 371 (c)(1),
(2), (4) Date: May 27, 2008

(87) PCT Pub. No.: WO2006/125935
PCT Pub. Date: Nov. 30, 2006

(65) Prior Publication Data
US 2009/0103097 A1    Apr. 23, 2009

(30) Foreign Application Priority Data
May 27, 2005 (GB) .................................. 0510916.0

(51) Int. Cl.
*G01N 21/00* (2006.01)
(52) U.S. Cl. ..................................................... 356/445
(58) Field of Classification Search .......... 356/445–448
See application file for complete search history.

(56) References Cited

U.S. PATENT DOCUMENTS

| | | |
|---|---|---|
| 3,952,196 A | 4/1976 | Larsen |
| 4,405,234 A | 9/1983 | Juaire |
| 4,464,575 A | 8/1984 | Cholin et al. |
| 4,529,881 A | 7/1985 | Ceurvels et al. |
| 4,547,673 A | 10/1985 | Larsen et al. |
| 4,728,794 A | 3/1988 | Allen |
| 4,752,768 A | 6/1988 | Steers et al. |
| 4,823,015 A | 4/1989 | Galvin et al. |
| 4,826,316 A | 5/1989 | Odum |
| 4,864,146 A | 9/1989 | Hodges et al. |
| 5,264,708 A | 11/1993 | Hijikata |
| 5,495,112 A | 2/1996 | Maloney et al. |
| 5,561,290 A | 10/1996 | Strobel et al. |

(Continued)

FOREIGN PATENT DOCUMENTS

AT    E 37 454 B    11/1982

(Continued)

OTHER PUBLICATIONS

Office Action issued Jul. 30, 2010 in U.S. Appl. No. 11/921,111 (9 pgs).

(Continued)

*Primary Examiner* — Michael P Stafira
(74) *Attorney, Agent, or Firm* — Brinks Hofer Gilson & Lione

(57) ABSTRACT

A detector comprises a housing (1) having a window (3), a measuring and processing unit (2), a source (4) of electromagnetic radiation, a plurality of sensors (7), and a reflector (6). The measuring and processing unit (2), the electromagnetic radiation source (4) and the sensors (7) are mounted within the housing (1). The reflector (6) is mounted outside the housing (1). The reflector (6) is positioned to reflect electromagnetic radiation passing through the window (3) from the electromagnetic radiation source (4) onto the sensors (7) via the window. The sensors (7) are operatively associated with the measuring and processing unit (2) to provide that unit with an input indicative of the level of electromagnetic radiation reaching the sensors.

14 Claims, 1 Drawing Sheet

U.S. PATENT DOCUMENTS

| | | |
|---|---|---|
| 5,627,362 A | 5/1997 | Youngquist et al. |
| 5,914,489 A | 6/1999 | Baliga et al. |
| 6,078,050 A | 6/2000 | Castleman |
| 6,831,288 B1 | 12/2004 | Schmitt et al. |
| 2009/0127464 A1 | 5/2009 | Laluvein et al. |

FOREIGN PATENT DOCUMENTS

| | | |
|---|---|---|
| DE | 2 108 296 | 8/1972 |
| DE | 26 03 824 A1 | 8/1976 |
| DE | 42 40 395 A1 | 6/1994 |
| DE | 195 31 917 C1 | 3/1997 |
| EP | 0 064 811 | 11/1982 |
| EP | 0 078 443 A2 | 5/1983 |
| EP | 0 112 498 B1 | 2/1989 |
| EP | 0 409 266 A2 | 1/1991 |
| EP | 0 370 763 B1 | 6/1995 |
| EP | 0 532 768 B1 | 8/1995 |
| EP | 0 953 952 A2 | 11/1999 |
| GB | 2 097 120 A | 10/1982 |
| GB | 2 309 300 A | 7/1997 |
| GB | 2 349 459 A | 11/2000 |
| GB | 2 395 260 A | 5/2004 |
| JP | 06282774 A | 10/1994 |
| JP | 2002298242 | 10/2002 |
| JP | 2003296848 | 10/2003 |
| JP | 2005121490 | 5/2005 |
| WO | WO96/06865 A1 | 3/1996 |
| WO | WO2004/019298 A2 | 3/2004 |

OTHER PUBLICATIONS

Response to Opposition to EP 1894178 in the name of Thorn Security Limited dated Feb. 15, 2010 (16 pgs).

Letter from the opponent filed in EP Appln. No. 06709817.8-1232 dated Jul. 19, 1010 (37 pgs) (including translation).

General Monitors, Flame Detection, "Models TL100/TL103—UV/IR Test Lamp" alleged in Letter from the opponent to be dated Dec. 2001.

Letter from Bernt GmbH to Minimax GmbH, "Portable UV/IR—Test Lamp TL 102" dated Dec. 3, 1998 (2pgs).

General Monitors, "Portable Test Lamps for UV and UV/IR Fire Alarm Systems", TI 102 UV/IR Test Lamp (4 pgs) (including translation).

SharpEye 20/20-310, Long-Range $IR^3$ Fire Simulator, dated Nov. 2002 (1 pg).

SharpEye 20/20-311, Long-Range UV/IR Fire Simulator, dated Nov. 2002 (1 pg).

J.F. Middleton, *"Developments in Flame Detectors"*, Fire Safety Journal 6 (1983) pp. 175-182.

Office Action issued Aug. 6, 2010 in Australian Appl. No. 2006251047 (2 pgs).

User Manual for Infra-Red Flame Detection "S200+ Series Triple IR Flame Detectors" (67 pgs), (2004).

Office Action issued Jan. 21, 2010 in U.S. Appl. No. 11/921,111 (8 pgs).

Office Action issued Jun. 19, 2009 in U.S. Appl. No. 11/921,111 (7 pgs).

General Monitors, "Portable Test Lamps for UV and UV/IR Fire Alarm Systems", TI 102 UV/IR Test Lamp (4 pgs) (including translation), Mar. 1994.

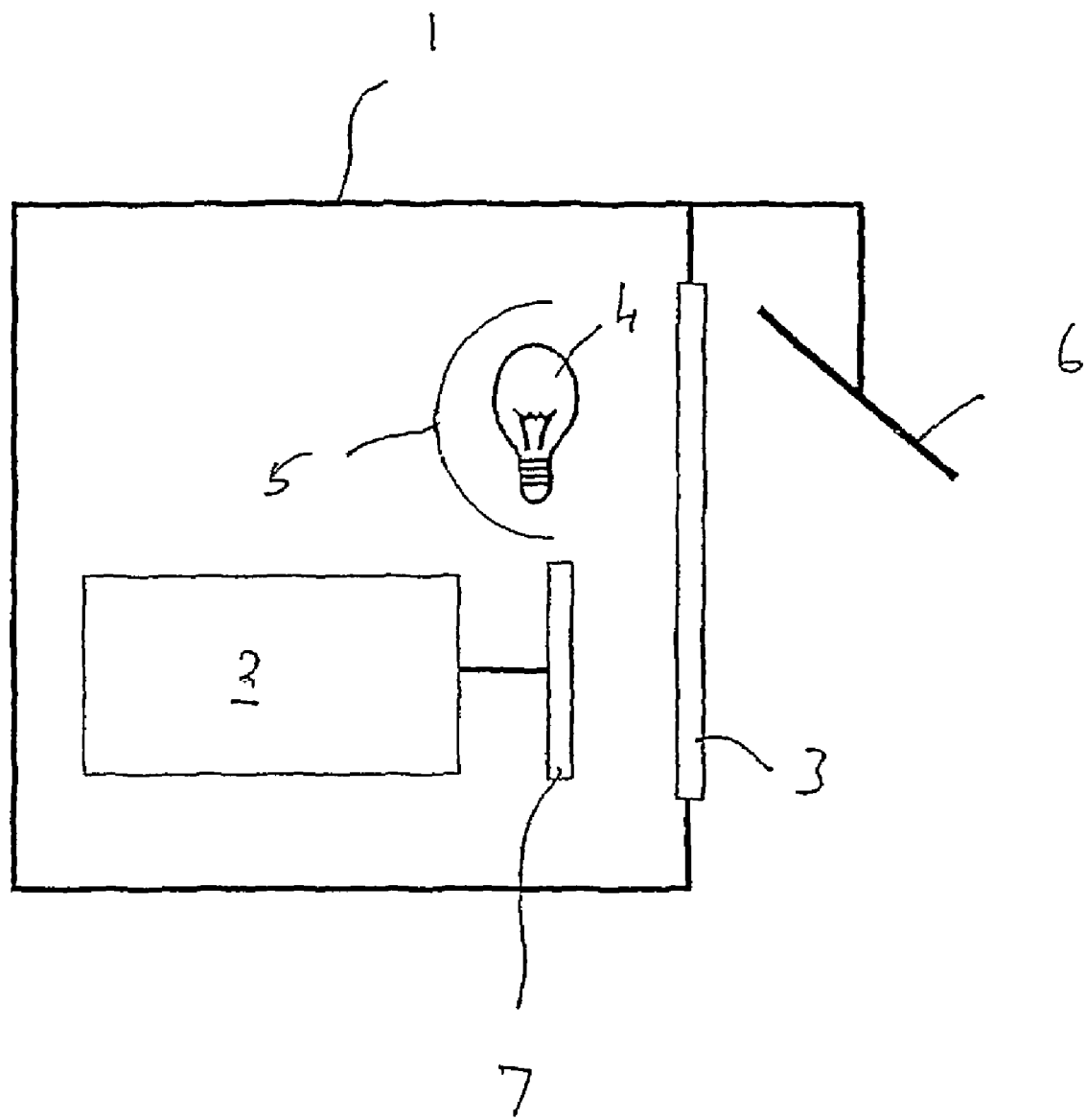

WINDOW CLEANLINESS DETECTION SYSTEM

RELATED APPLICATION

This application claims the benefit of the prior foreign application GB 0510916.0, filed May 27, 2005. The entire teachings of the above application are incorporated herein by reference.

BACKGROUND OF INVENTION

This invention relates to a fire detector, and in particular to a flame detector that detects the presence of a fire by sensing the presence of a flame.

A flame detector is often installed outdoors in a harsh environment. The sensor of the flame detector looks out through a window that can become dirty, and this tends to reduce the effectiveness of the flame detector. The dirt can blow onto the window of the flame detector either as wet or dry air-born particles. There is, therefore, a need to check that the window of a flame detector is clean enough to provide accurate flame detection, and to identify and report any condition where the window is too dirty for the detector to operate correctly.

Traditionally, the window of a flame detector is checked by shining a source provided within the detector through the window onto an external reflector, which reflects that signal back onto a single sensor mounted within the flame detector. The reflected signal is measured, and a reference signal level is taken for a clean window. If the window becomes dirty, then the amplitude of the reflected signal level will be reduced. If the reflected signal level falls below a predetermined reference level, the window is considered to be too dirty for the flame detector to operate correctly.

Known flame detectors incorporate a precise optical system whose optical path gives an accurate, reliable and consistent measurement of the reference signal level. In particular, the external reflector needs to be carefully shaped, and rigidly mounted. The external reflector may also need to be tuned to the requirements of the particular flame detector concerned. An aim of the invention is to provide a flame detector having an inbuilt optical path monitoring facility for checking the cleanliness of its window.

SUMMARY OF THE INVENTION

The present invention provides a detector comprising a housing having a window, a source of electromagnetic radiation, a plurality of sensors, and a reflector, the electromagnetic radiation source and the sensors being mounted within the housing, and the reflector being mounted outside the housing, wherein the reflector is positioned to reflect electromagnetic radiation passing through the window from the electromagnetic radiation source onto the sensors via the window, and wherein the sensors provide an output indicative of the level of electromagnetic radiation reaching the sensors.

Preferably, the detector comprises a measuring and processing unit, wherein the sensors are operatively associated with the measuring and processing unit to provide that unit with an input indicative of the level of electromagnetic radiation reaching the sensors. The measuring and processing unit may be mounted within the housing.

Advantageously, the window is made of a material that is substantially transparent to the electromagnetic radiation emitted by the electromagnetic radiation source.

In a preferred embodiment, the detector further comprises a further reflector associated with the electromagnetic radiation source for focusing radiation from that source onto the external reflector via the window.

Conveniently, an array of sensors constitutes the plurality of sensors. Preferably, a 16×16 array of sensors constitutes the plurality of sensors.

Preferably, each sensor is adapted to sense electromagnetic radiation of the frequency emitted by the electromagnetic radiation source.

In a preferred embodiment, the source of electromagnetic radiation is a light source. In this way, the light source may be arranged to emit light having a frequency which matches that of a flame.

Advantageously, the source of electromagnetic radiation is arranged to emit a pulsed output signal, the pulses preferably being emitted at a regular frequency.

There may be provided two, or more, of said sources of electromagnetic radiation.

The invention thus provides a method of assessing the cleanliness of a window forming part of a detector, the detector housing a source of electromagnetic radiation, a plurality of sensors and a measuring and processing unit, the detector further comprises an external reflector positioned to reflect electromagnetic radiation passing through the window from the electromagnetic radiation source onto the sensors via the window, the sensors being operatively associated with the measuring and processing unit to provide that unit with an input indicative of the level of electromagnetic radiation reaching the sensors, the method comprising the step of comparing the input from the sensors to the measuring and processing unit when the window is known to be clean and when the detector has been operating for some time, whereby the measuring and processing unit provides an indication of the state of cleanliness of the window.

Preferably, the measuring and processing unit provides an output at a reference level when the window is known to be clean, and provides an output to indicate a first predetermined level of dirtiness when the input to the measuring and processing unit differs from the reference level by a first predetermined amount.

Advantageously, the measuring and processing unit provides a second output to indicate a second predetermined level of dirtiness when the input to the measuring and processing unit differs from the reference level by a second predetermined amount.

BRIEF DESCRIPTION OF THE DRAWING

The invention will now be described in greater detail, by way of example, with reference to the drawing, the single FIGURE which is a schematic representation of a flame detector constructed in accordance with the invention.

DESCRIPTION OF PREFERRED EMBODIMENT

Referring to the drawing, a flame detector has a housing 1 provided with a flame detector measurement and processing unit 2 for detecting the presence of a flame external to the detector through a window 3. A lamp 4 is mounted within the detector housing 1, a concave reflector 5 being associated with the lamp 4 focusing light from the lamp through the window 3 onto an external reflector 6. The lamp 4 is electrically monitored by means of a circuitry (not shown) to confirm that it is working and is in a light-emitting condition. The circuitry measures the current flowing through the lamp once any surge current at switch on has subsided.

The reflector 6 is angled so as to reflect light from the lamp 4 through the window 3 onto a sensor array 7 mounted within the housing 1. Typically, the sensor array 7 is constituted by a grid of 16×16 radiation sensors. The lamp 4 uses the same part of the electromagnetic spectrum as the measurement and processing unit 2 uses for flame detection, so that the cleanliness of the window 3 is assessed at the operating wavelength. The lamp 4 is arranged to produce a pulsed output signal. In this way, the signal is distinguished from background radiation.

The light signal reflected by the reflector 6 is measured by each of the sensors in the array 7, whose outputs are combined in the measurement and processing unit 2 to provide an accurate measurement of the cleanliness of the window 3. During or after manufacture of the flame detector, and before the detector is installed, a measurement is performed when the window 3 is clean to provide a reference level indicative of a clean window. When the flame detector is positioned for operational use, measurements are performed, either manually or automatically, on a regular basis. If such a measurement provides a level that falls below a first, predetermined threshold, the window 3 is considered to be dirty. If, however, the measured signal level falls below a second, lower, predetermined threshold, the window 3 is considered to be obscured. In either case, the flame detector is arranged to provide a warning signal of the window condition. The warning signal can, for example, be provided by differently-coloured LEDs forming part of the flame detector, or can be transmitted to a central control unit via control circuitry.

It will be apparent that the use of an array 7 of sensors averages the light signal reflected by the reflector 6, thereby giving greater resilience to tolerances in the optical path. This is particularly important where the window 3 is subjected to varying degrees of dirtiness. The use of multiple sensors also ensures that the light signal reflected by the reflector 6 can be detected over a relatively wide area. The system can, therefore, cope with greater variations in the optical path, compared to the use of a system utilising a single sensor.

As the signal is detected over a large area, the cleanliness of the window 3 is also measured over a large area, thereby resulting in an improved test of the cleanliness of the window.

It is preferred to use two lamps rather than the single lamp described above, thereby giving resilience to the system in the event of one lamp failing.

The invention claimed is:

1. A fire detector comprising:
   a housing having at least one window;
   a source of electromagnetic radiation;
   one or more sensors for sensing radiation emitted by a flame;
   a first reflector;
   a second reflector associated with the electromagnetic radiation source, the second reflector being arranged to focus radiation from the source through the window onto the first reflector; and
   a measuring and processing unit mounted within the housing, wherein the one or more sensors are operatively associated with the measuring and processing unit so as to provide the measuring and processing unit with an input indicative of the electromagnetic radiation reaching the one or more sensors;
   wherein the electromagnetic radiation source and the one or more sensors are mounted within the housing, and the reflector is mounted outside the housing; and
   wherein the first reflector is positioned to reflect electromagnetic radiation from the source passing out through the window back through the window onto the one or more sensors
   wherein the one or more sensors sense both the reflected electromagnetic radiation passing through the window and electromagnetic radiation emitted by the flame.

2. A detector as claimed in claim 1, wherein the signal processing unit is such as to provide two separate outputs to indicate first and second predetermined levels of dirtiness of the window.

3. A detector as claimed in claim 1, wherein the window is made of the material that is substantially transparent to the electromagnetic radiation emitted by the electromagnetic radiation source.

4. A detector as claimed in claim 1, wherein an array of sensors constitutes the one or more sensors.

5. A detector as claimed in claim 4, wherein a 16×16 array of sensors constitutes the one or more sensors.

6. A detector as claimed in claim 1, wherein the source of electromagnetic radiation is a light source.

7. A detector as claimed in claim 1, wherein the source of electromagnetic radiation is arranged to emit a pulsed output signal.

8. A detector as claimed in claim 1, further comprising means for monitoring the source of electromagnetic radiation to confirm that it is working and is in a light-emitting condition.

9. A detector as claimed in claim 1, wherein two, or more, sources of electromagnetic radiation are provided within the housing.

10. A method of assessing the cleanliness of at least one window forming part of a fire detector, the detector housing a source of electromagnetic radiation arranged to emit radiation, one or more sensors, the one or more sensors for sensing radiation emitted by a flame, a measuring and processing unit, and a first reflector associated with the electromagnetic radiation source positioned to reflect at least some of electromagnetic radiation emitted from the electromagnetic radiation source through the window, the detector further comprising a second reflector positioned to reflect at least part of the electromagnetic radiation reflected by the first reflector back through the window onto the one or more sensors, the one or more sensors being operatively associated with the measuring and processing unit to provide that unit with an input indicative of the level of electromagnetic radiation reaching the one or more sensors, the method comprising:
   comparing the input from the one or more sensors to the measuring and processing unit when the window is known to be clean and when the detector has been operating for some time, whereby the measuring and processing unit provides an indication of a state of cleanliness of the window.

11. A method as claimed in claim 10, wherein the measuring and processing unit provides an output at a reference level when the window is known to be clean, and provides an output to indicate a first predetermined level of dirtiness when the input to the measuring and processing unit differs from the reference level by a first predetermined amount.

12. A method as claimed in claim 11, wherein the measuring and processing unit provides a second output to indicate a second predetermined level of dirtiness when the input to the measuring and processing unit differs from the reference level by a second predetermined amount.

13. A detector as claimed in claim 1, wherein the second reflector comprises a concave reflector.

14. A detector as claimed in claim 1, wherein each of the one or more sensors is adapted to sense electromagnetic radiation at substantially a same part of an electromagnetic spectrum as that emitted by the electromagnetic radiation source.

* * * * *

UNITED STATES PATENT AND TRADEMARK OFFICE
CERTIFICATE OF CORRECTION

Page 1 of 1

PATENT NO. : 7,948,628 B2
APPLICATION NO. : 11/921113
DATED : May 24, 2011
INVENTOR(S) : Laluvein et al.

It is certified that error appears in the above-identified patent and that said Letters Patent is hereby corrected as shown below:

Claim 1:

Column 4 Line 3:
Whereas, "reflector is mounted" should be corrected to read "first reflector is mounted".

Column 4 Line 11:
Whereas, "and electromagnetic radiation" should be corrected to read "and the radiation".

Signed and Sealed this
Twenty-first Day of June, 2011

David J. Kappos
*Director of the United States Patent and Trademark Office*